United States Patent
Xu et al.

(10) Patent No.: US 12,154,158 B2
(45) Date of Patent: Nov. 26, 2024

(54) SYSTEM AND METHOD FOR AUTOMATICALLY GENERATING SIMILAR ITEMS USING SPECTRAL FILTERING

(71) Applicant: Walmart Apollo, LLC, Bentonville, AR (US)

(72) Inventors: Da Xu, San Jose, CA (US); Venugopal Mani, Sunnyvale, CA (US); Chuanwei Ruan, Santa Clara, CA (US); Sushant Kumar, Sunnyvale, CA (US); Kannan Achan, Saratoga, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 119 days.

(21) Appl. No.: 17/163,510

(22) Filed: Jan. 31, 2021

(65) Prior Publication Data

US 2022/0261873 A1 Aug. 18, 2022

(51) Int. Cl.
| | |
|---|---|
| G06Q 30/0601 | (2023.01) |
| G06F 16/21 | (2019.01) |
| G06N 5/04 | (2023.01) |
| G06N 20/00 | (2019.01) |
| G06Q 30/0201 | (2023.01) |

(52) U.S. Cl.
CPC ....... *G06Q 30/0631* (2013.01); *G06F 16/212* (2019.01); *G06N 5/04* (2013.01); *G06N 20/00* (2019.01); *G06Q 30/0201* (2013.01)

(58) Field of Classification Search
None
See application file for complete search history.

(56) References Cited

U.S. PATENT DOCUMENTS

| | | |
|---|---|---|
| 6,266,649 B1 | 7/2001 | Linden et al. |
| 10,275,819 B1 * | 4/2019 | Johnson .......... G06N 5/022 |

(Continued)

OTHER PUBLICATIONS

Zhang, X., Zhou, Y., Wang, J., & Lu, X. (2021). Personal interest attention graph neural networks for session-based recommendation. Entropy, 23(11), 1500. doi:http://dx.doi.org/10.3390/e23111500 (Year: 2021).*

*Primary Examiner* — Jeffrey A. Smith
*Assistant Examiner* — Ashley D Preston
(74) *Attorney, Agent, or Firm* — BRYAN CAVE LEIGHTON PAISNER LLP

(57) ABSTRACT

A system including one or more processors and one or more non-transitory computer-readable media storing computing instructions configured to run on the one or more processors and perform generating one or more item relational graphs for one or more items based on historical user purchases; transforming, using spectral filtering, the one or more item relational graphs into one or more frequency signals to remove noise from the one or more frequency signals; constructing, using a machine learning model, one or more item pair label classifications for one or more item pairs of the one or more items; generating a respective similarity score for each of the one or more item pairs; outputting a top k results for the one or more item pairs ranked by the respective similarity scores; and re-ranking, using a re-ranking algorithm, the top k results of the one or more item pairs based on a user preference for display on a user interface of an electronic device of a user. Other embodiments are disclosed.

20 Claims, 7 Drawing Sheets

(56) References Cited

U.S. PATENT DOCUMENTS

| | | |
|---|---|---|
| 2011/0213651 A1 | 9/2011 | Milana et al. |
| 2012/0290434 A1 | 11/2012 | Moritz et al. |
| 2013/0142418 A1* | 6/2013 | Van Zwol ............. G06V 20/47 |
| | | 382/159 |
| 2014/0214676 A1* | 7/2014 | Bukai .................... G10L 17/24 |
| | | 705/44 |
| 2016/0005097 A1* | 1/2016 | Hsiao ................ G06Q 30/0631 |
| | | 705/26.7 |
| 2019/0318227 A1* | 10/2019 | Bronstein ......... G06F 16/24578 |
| 2020/0250734 A1 | 8/2020 | Pande et al. |
| 2020/0380578 A1 | 12/2020 | Xu et al. |
| 2021/0056261 A1* | 2/2021 | Sullivan ............... G06Q 50/184 |
| 2021/0383254 A1* | 12/2021 | Renders ................ G06N 3/045 |
| 2022/0108075 A1* | 4/2022 | Kehler .................. G06N 5/003 |

\* cited by examiner

SYSTEM AND METHOD FOR AUTOMATICALLY GENERATING SIMILAR ITEMS USING SPECTRAL FILTERING

TECHNICAL FIELD

This disclosure relates generally relates to similar items using spectral filtering.

BACKGROUND

Webpages can provide users with more and more options to explore items that are similar to one another. Similar items can be ordered over a regularly ordered item for multiple reasons that can be personalized for each user engaged in online shopping.

BRIEF DESCRIPTION OF THE DRAWINGS

To facilitate further description of the embodiments, the following drawings are provided in which.

Figure 1:
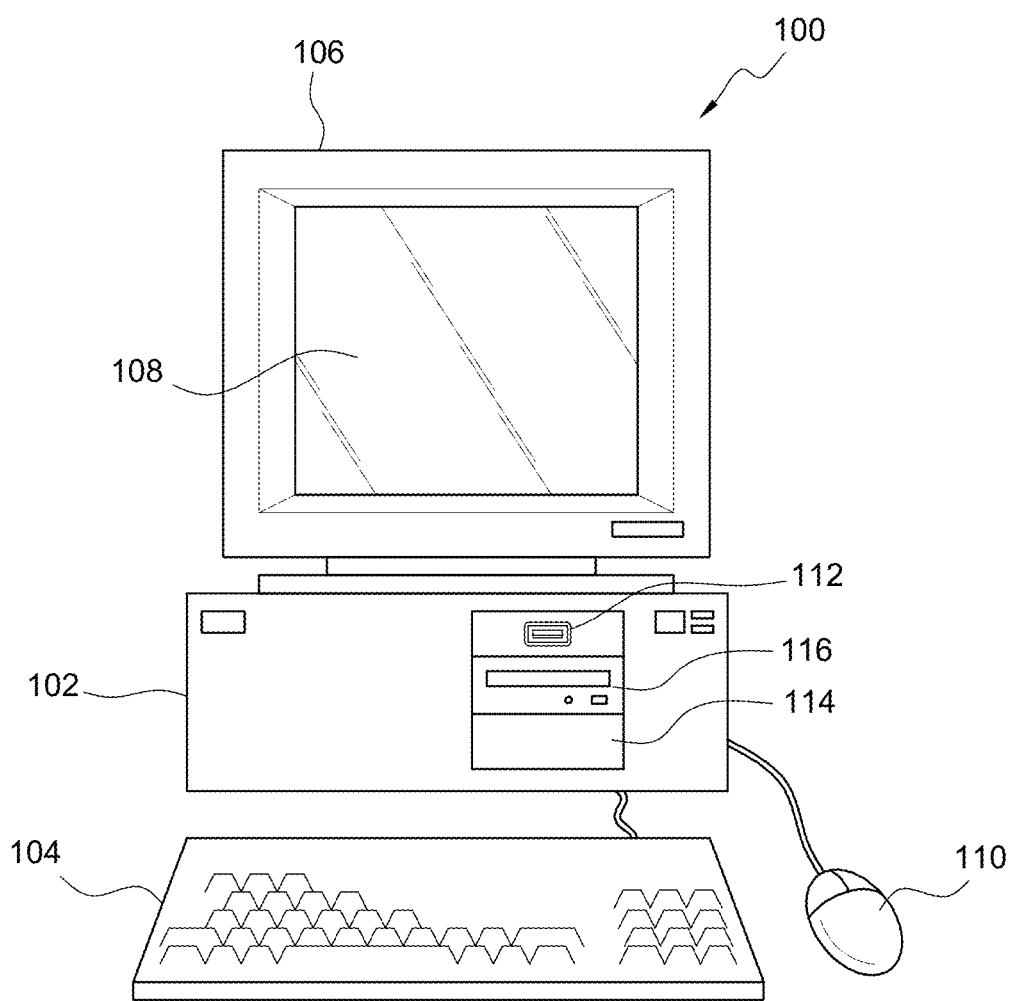
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Figure 2:
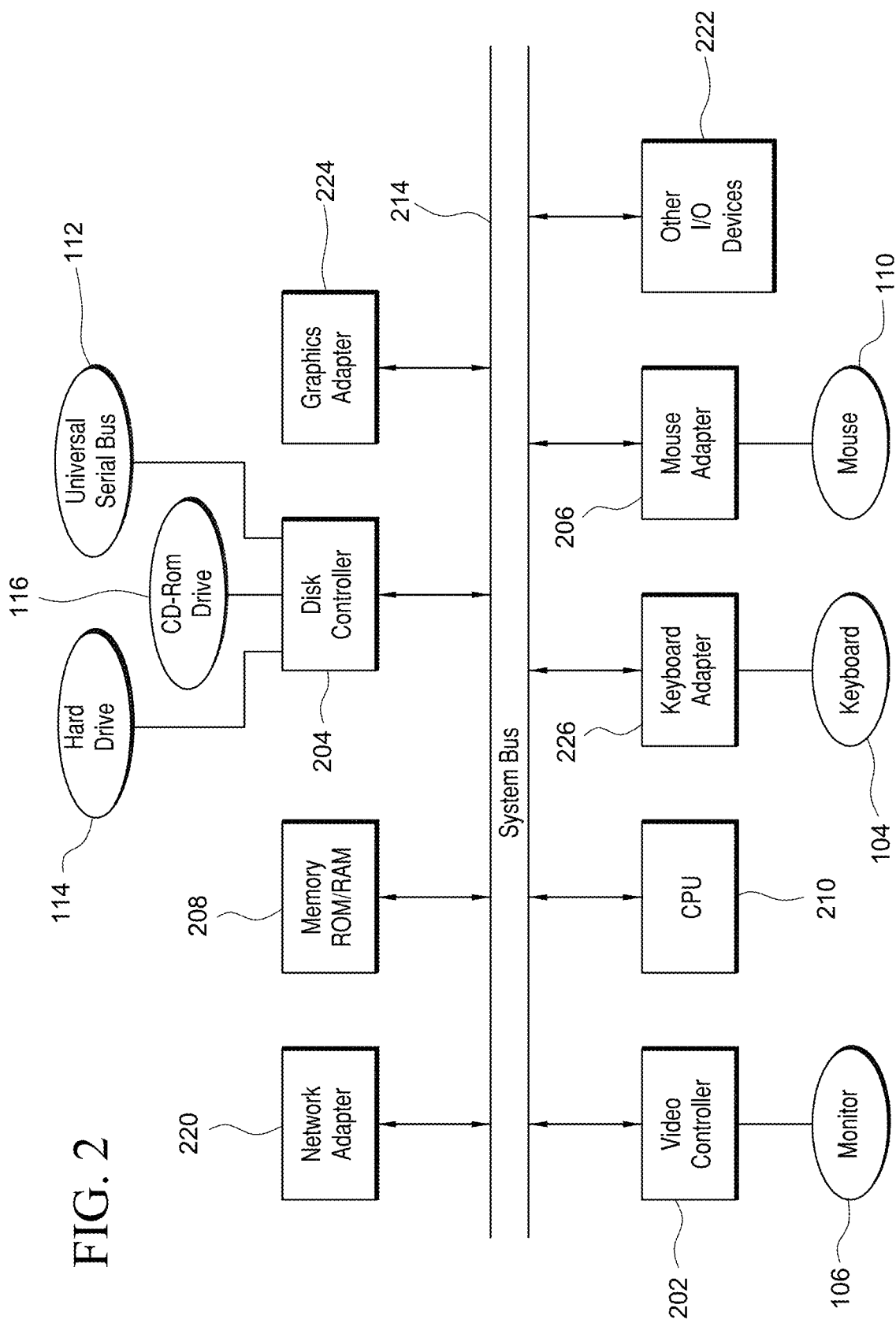
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
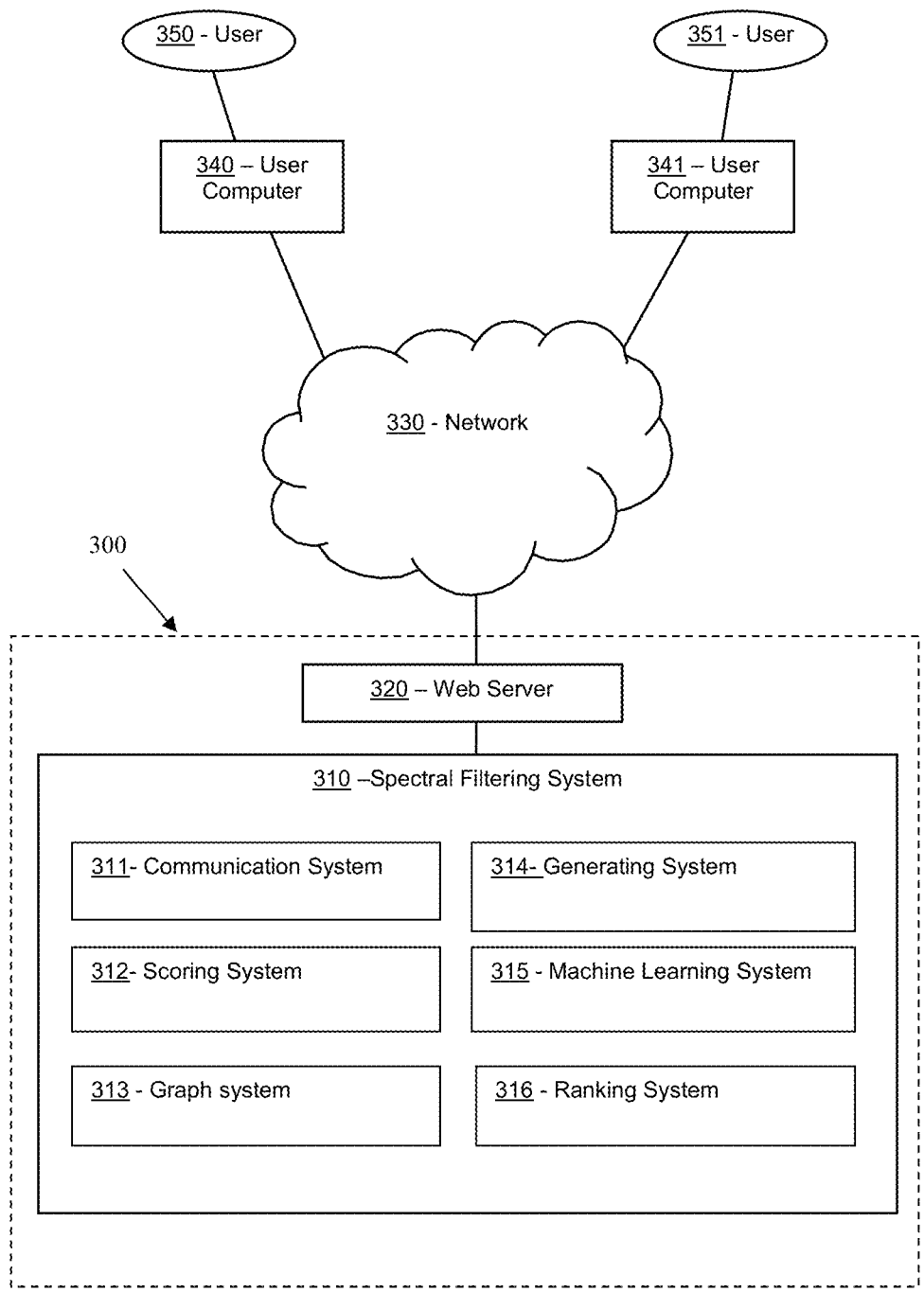
FIG. 3 illustrates a block diagram of a system that can be employed for an automatic reactive attribute management platform for a product, according to an embodiment.

Turning ahead in the drawings, FIG. 3 illustrates a block diagram of a system 300 that can be employed for automatically determining similar items using spectral filtering.

System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. System 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In many embodiments, system 300 can include a spectral filtering system 310 and/or a web server 320. Spectral filtering system 310 and/or web server 320 can each be a computer system, such as computer system 100 (FIG. 1), as described above, and can each be a single computer, a single server, or a cluster or collection of computers or servers, or a cloud of computers or servers. In another embodiment, a single computer system can host two or more of, or all of, spectral filtering system 310 and/or web server 320. Additional details regarding spectral filtering system 310 and/or web server 320 are described herein.

In a number of embodiments, each of spectral filtering system 310 and/or web server 320 can be a special-purpose computer programed specifically to perform specific functions not associated with a general-purpose computer, as described in greater detail below.

In some embodiments, web server 320 can be in data communication through network 330 with one or more user computers, such as user computers 340 and/or 341. Network 330 can be a public network, a private network or a hybrid network. In some embodiments, user computers 340-341 can be used by users, such as users 350 and 351, which also can be referred to as customers, in which case, user computers 340 and 341 can be referred to as customer computers. In many embodiments, web server 320 can host one or more sites (e.g., websites) that allow users to browse and/or search for items (e.g., products), to add items to an electronic shopping cart, and/or to order (e.g., purchase) items, in addition to other suitable activities.

In some embodiments, an internal network that is not open to the public can be used for communications between spectral filtering system 310 and/or web server 320 within system 300. Accordingly, in some embodiments, spectral filtering system 310 (and/or the software used by such systems) can refer to a back end of system 300, which can be operated by an operator and/or administrator of system 300, and web server 320 (and/or the software used by such system) can refer to a front end of system 300, and can be accessed and/or used by one or more users, such as users 350-351, using user computers 340-341, respectively. In these or other embodiments, the operator and/or administrator of system 300 can manage system 300, the processor(s) of system 300, and/or the memory storage unit(s) of system 300 using the input device(s) and/or display device(s) of system 300.

In certain embodiments, user computers 340-341 can be desktop computers, laptop computers, a mobile device, and/or other endpoint devices used by one or more users 350 and 351, respectively. A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

In several embodiments, each of spectral filtering system 310 and web server 320 can include one or more input devices (e.g., one or more keyboards, one or more keypads, one or more pointing devices such as a computer mouse or computer mice, one or more touchscreen displays, a microphone, etc.), and/or can each include one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to spectral filtering system 310 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of spectral filtering system 310. In a similar manner, the processors and/or the non-transitory computer-readable media can be local and/or remote to each other.

Meanwhile, in many embodiments, the components of system 300 (including spectral filtering system 310 and web server 320) also can be configured to communicate individually and/or collectively with and/or include one or more databases. The one or more databases can include a product database that contains information about products, items, or SKUs (stock keeping units), for example, among other data as described herein, such as described herein in further detail. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between the components of system 300 (including spectral filtering system 310, web server 320, and any databases), and between network 330 and/or the one or more databases can be implemented using any suitable manner of wired and/or wireless communication. Accordingly, spectral filtering system 310 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In many embodiments, spectral filtering system 310 can include a communication system 311, an embedding system 312, a graph system 313, a classification system 314, a machine-learning system 315, and/or a re-rank system 316. In many embodiments, the systems of spectral filtering system 310 can be modules of computing instructions (e.g., software modules) stored at non-transitory computer readable media that operate on one or more processors. In other embodiments, the systems of spectral filtering system 310 can be implemented in hardware. Each of the above-referenced systems of spectral filtering system 310 can be a computer system, such as computer system 100 (FIG. 1), as described above, and can be a single computer, a single server, or a cluster or collection of computers or servers, or a cloud of computers or servers. In another embodiment, a single computer system can host spectral filtering system 310. Additional details regarding spectral filtering system 310 and the components thereof are described herein.

Figure 5:
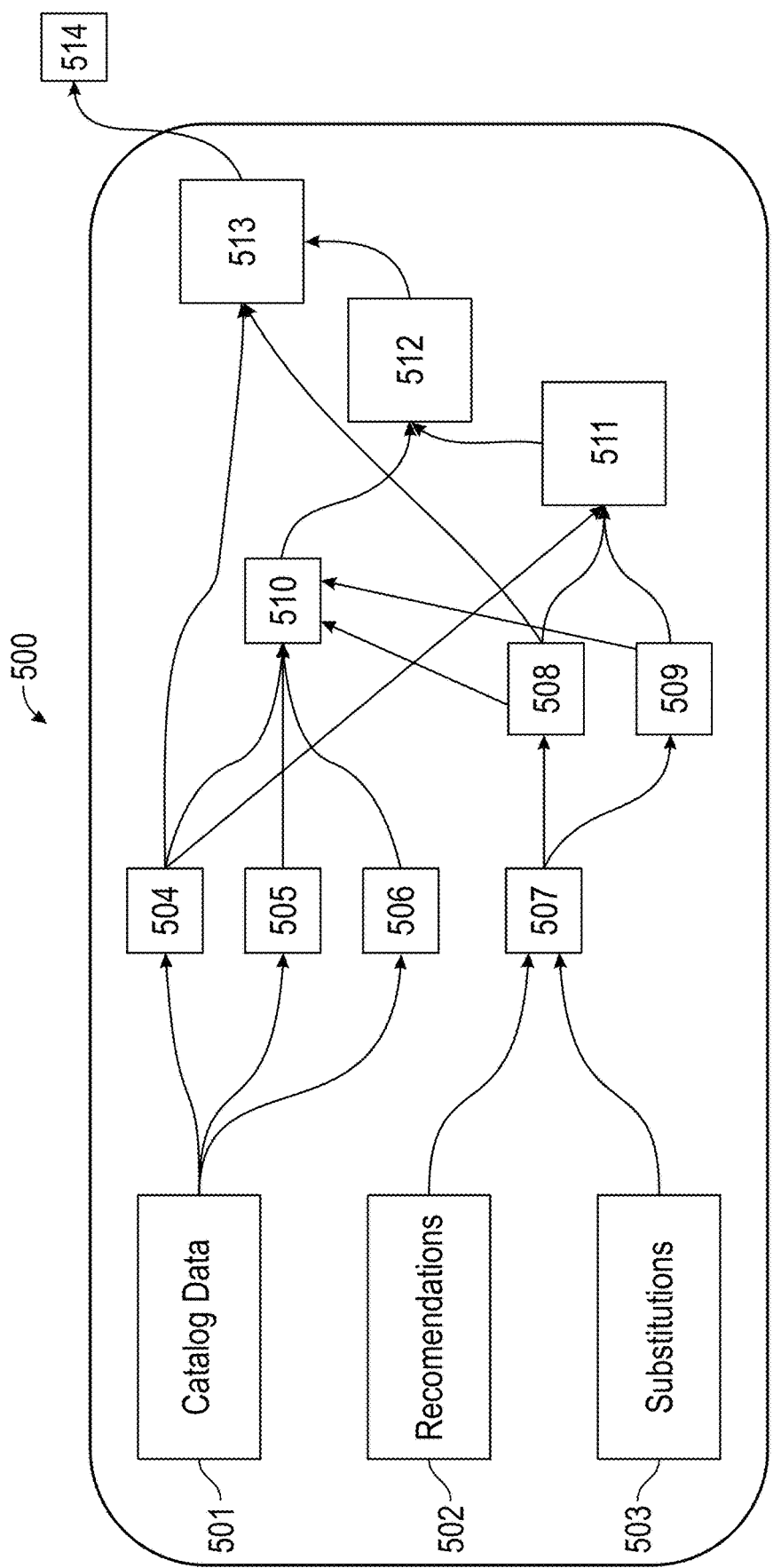
FIG. 5 illustrates a representative block diagram of automatically generating similar items using spectral filtering spectral filtering system, according to the embodiment of FIG. 3.

Turning ahead in the drawings, FIG. 5 illustrates a block diagram for a block diagram 500 of acts, modules, and outputs, which can be employed for automatically generating similar items using spectral filtering, according to an embodiment. Block diagram 500 is merely exemplary and embodiments of the acts, modules, and outputs are not limited to the embodiments presented herein. The acts, modules, and outputs can be employed in many different embodiments or examples not specifically depicted or described herein. In some embodiments, certain elements of block diagram 500 can perform, involve, and/or be generated by involve various procedures, processes, and/or activities. In other embodiments, the procedures, processes, and/or activities can be performed by, and the outputs can be generated by, other suitable elements of block diagram 500. In many embodiments, block diagram 500 can be implemented by spectra filtering system 310 (FIG. 3).

In several embodiments, block diagram 500 illustrates an example of a data pipeline of how to generate a personalized item recommendation that is similar to an item ordered by a user, by using item relational graphs with a spectral filtering layer. Block diagram 500 can include an end-to-end data pipeline based on outputs of three algorithms: algorithm 511 (e.g., a spectral filtering algorithm), algorithm 512 (e.g., a feed-forward neural network), and algorithm 513 (e.g., a recall-rerank inference algorithm). In some embodiments, a personalized top k list of similar items output from block diagram 500 and can be based on outputs of each level of these three algorithms, where each output of an earlier algorithm can be used as a portion of input for the next level of algorithm.

In several embodiments, algorithm 511 can be a spectral filtering algorithm that can filter out noise in the item relational graphs. In several embodiments, input for algorithm 511 can include historical data from one or more item relational graphs and encoded item data retrieved from a catalog, where such encoded item data can be similar or identical to data 504 (e.g., catalog data). In various embodiments, algorithm 511 can include input from graph 508 (e.g., an item relational graph built using recommended items) and graph 509 (e.g., an item relational graph built using items recommended as substitutes).

In a number of embodiments, input data for graph 508 and graph 509 can be retrieved from data 507. Data 507 can include a set of input data retrieved from two data sources. Data 507 can include raw data 502 (e.g., customer online data including recommended items displayed to a customer) and raw data 503 (e.g., customer records of items recommended as substitute items) as input data. Data 507 can be a data source used to build one or more item relational graphs associated with one or more types of user actions or interactions, or customer behaviors.

In some embodiments, raw data 502 can include records of items recommend to users (e.g., customers) tracked over a period of time including user actions (e.g., clicks on a website) such as whether the user ordered the item recommended or did not order the item recommended. In various embodiments, graph 508 (e.g., item relational graph) can be built using tracked metrics such as click data (e.g., acceptance, order) for an item B recommended for an item A. In some embodiments, graph 508 can be based on another suitable user action(s).

In some embodiments, raw data 503 can include records of items recommend to users as a substitute for an other item tracked over a period of time including user actions (e.g., clicks on a website) such as whether the user ordered the other item recommended or did not order the other item recommended. In various embodiments, graph 509 (e.g., an item relational graph) can be built using tracked metrics such as click data (e.g., acceptance, order) for an item A that went out of stock and an item B recommended as a substitute for item A. In a number of embodiments, exemplary item relational graphs, such as graphs 508 and 509 can be illustrated in FIG. 6, as described below.

In several embodiments, algorithm 511 can transform signals (e.g., user actions) from complex item relational graphs into a time-frequency domain. In several embodiments, algorithm 511 can perform a filtering process to remove (e.g., de-noise) irrelevant, unusual, erroneous, etc. signals of data tracked on the item relational graph. In various embodiments, algorithm 511 can be performed by block 440 (FIG. 4), as described below.

In several embodiments, algorithm 512 can be a feed-forward neural network that can be used to classify item pairs based on levels of similarity to one another. In some embodiments, in addition to input from a data 510, output of algorithm 511 can be used as a portion of input data for algorithm 512. For example, a feed-forward neural network for input item A and input item B, encoded as vecA and vecB, respectively, can classify whether this item pair has a positive label. In some embodiments, outputting a top k list of similar items based on a similarity score for each item pair can be displayed on a user interface of an electronic device (e.g., display 514), using the output from algorithm 512. In many embodiments, the top k list of similar items can be ordered as a hierarchy by the respective similarity scores of the items. In various embodiments, algorithm 512 can be performed by one or more of blocks 450, 455, and 460 (FIG. 4), as described below.

In various embodiments, data 510 can be a repository of multiple sources of information related to items obtained from catalog data 501. Data 510 can specify whether to label an item pair with a positive label and/or as a positive sample using a machine-learning classification model. Sources of input into data 510 can include data 504 (e.g., item information encoded using contextual feature encoding) data 505 (e.g., product hierarchy information for a category using poincare encoding), data 506 (e.g., a Jaccard similarity score for item pairs) as well as output from graph 508 and/or graph 509.

In several embodiments, algorithm 513 can be a re-ranking algorithm (e.g., a recall-rerank inference algorithm) that changes the hierarchical order of the top k similar item pairs list that are to an anchor item ordered or added-to-cart based on personalization parameters of a user. In some embodiments, all of the ranked item pairs (item A, item B) can be assigned similarity scores as outputs of algorithm 512. In various embodiments, the quantity of all ranked item pairs can number in the millions for an anchor item. In some embodiments, a subset of the ranked item pairs (item A, item B) can be constructed as a recall set as the top level of the hierarchical top k items, which can include the optimal item-pair. In many embodiments, such a subset (recall set) can be constructed by using input from three areas: 1) data 504 (e.g., high contextual feature encoding for items), graph 509 and 2) high relative gain to determine a level of similarity between each pair of nodes connected by edge weights on graph 508. In several embodiments, each candidate pair for the top k item pairs can be ranked in a hierarchical structure with similarity scores from most similar to less similar, via algorithm 512. In many embodiments, algorithm 513 can add a personalization layer to the data pipeline that can change the order of a display 514 to a user based on user preference. In various embodiments, the output of algorithm 512 can include the top k items also used for the personalization layer added by algorithm 513. In various embodiments, algorithm 513 can be performed by block 465 (FIG. 4), as described below.

Figure 4:
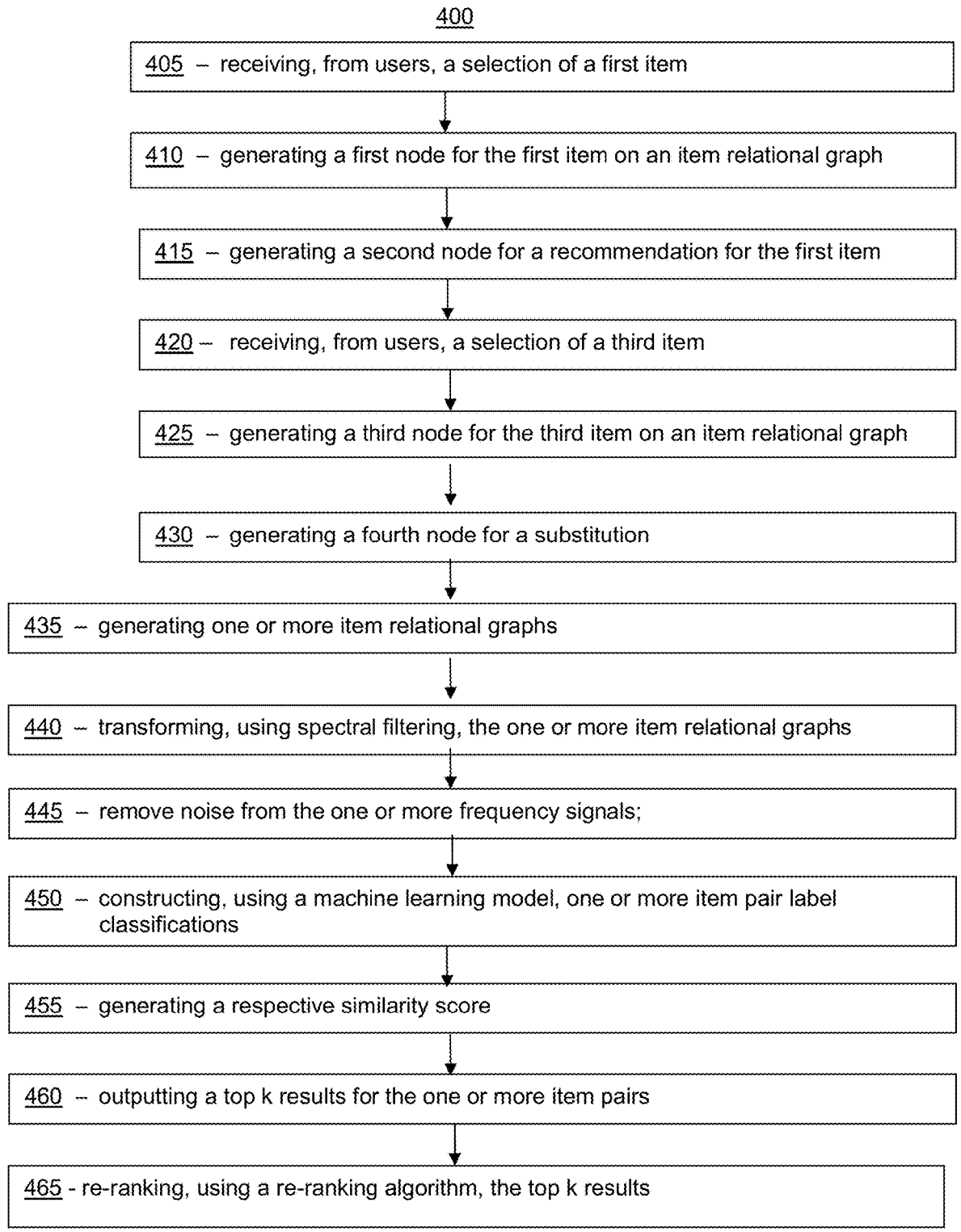
FIG. 4 illustrates a flow chart for a method, according to another embodiment.

Turning back in the drawings, FIG. 4 illustrates a flow chart for a method 400, according to another embodiment. In some embodiments, method 400 can be a method of automatically determining a similar item using spectral filtering. In many embodiments, determining a similar item using spectral filtering can be implemented based one or more item relational graphs. Method 400 is merely exemplary and is not limited to the embodiments presented herein. Method 400 can be employed in many different embodiments and/or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped. In several embodiments, system 300 (FIG. 3) and/or block diagram 500 (FIG. 5) can be suitable to perform method 400 and/or one or more of the activities of method 400.

In these or other embodiments, one or more of the activities of method 400 can be implemented as one or more computing instructions configured to run at one or more processors and configured to be stored at one or more non-transitory computer-readable media. Such non-transitory computer-readable media can be part of a computer system such as spectral filtering system 310 (FIG. 3) and/or web server 320 (FIG. 3). The processor(s) can be similar or identical to the processor(s) described above with respect to computer system 100 (FIG. 1).

Referring to FIG. 4, method 400 can include a block 405 of receiving, from users, a selection of a first item of the one or more items, wherein the first item is recommended to the users based on an anchor item.

In some embodiments, method 400 also can include a block 410 of generating a first node for the first item on an item relational graph of the one or more item relational graphs.

In several embodiments, method 400 additionally can include a block 415 of generating a second node for a recommendation for the first item, wherein the second node is connected to the first node on the item relational graph of the one or more item relational graphs. In various embodiments, an edge connecting the first node and the second node can include a recommendation edge weight based on a number of times the recommendation for the first item is selected by the users over a period of time. In some embodiments, blocks 405, 410, and 415 are not used in method 400.

In a number of embodiments, method 400 further can include a block 420 of receiving, from users, a selection of a third item of the one or more items, wherein the third item is substituted for a second item of the one or more items.

In various embodiments, method 400 additionally can include a block 425 of generating a third node for the third item on an item relational graph of the one or more item relational graphs.

In some embodiments, method 400 further can include a block 430 of generate a fourth node for a substitution of the third item for the second item. In several embodiments, the fourth node can be connected to the third node on the item relational graph of the one or more item relational graphs. In various embodiments, an edge connecting the third node and the fourth node can include a substitution edge weight based on a number of times the substitution of the third item for the second item is selected by the users over a period of time. In some embodiments, blocks 420, 425, and 430 are not used in method 400. In other embodiments, blocks 420, 425, and 430 are used in method 400, but occur before blocks 405, 410, and 415. In further embodiments, blocks 420, 425, and 430 are used in method 400, but occur simultaneously with or in parallel with blocks 405, 410, and 415.

In a number of embodiments, method 400 also can include a block 435 of generating one or more item relational graphs for one or more items based on historical user purchases.

In various embodiments, method 400 additionally can include a block 440 of transforming, using spectral filtering, the one or more item relational graphs into one or more frequency signals.

In some embodiments, filtering can be a widely-employed technique in the domain signal processing technology field. For example, by designing (data adaptive) filters, the desired signals can be preserved, and the irrelevant, unusual, or erroneous signals discarded.

As another example, when predicting the future temperature, using historical records, the short-term fluctuations (which occurs in the span of several seconds or minutes) can often be random noises that can be independent of an overall temperature trend. The random noises can often have very similar patterns (such as following a Gaussian noise process by the law of nature), and the terminology to describe the short-term character of these random noises can be frequency. Since frequency of a pattern is the reciprocal of its recurring time span, being short term can mean the random noise patterns can include high frequency. Therefore, to reveal (expose) the long-term patterns of temperature, removing the high-frequency components as a procedure can denoise the original data.

As another example, the role of spectral filtering can be an analogy to the first example described above. The main difference can include that the signal and noise are defined on the (nodes) of a graph. However, the technical detail for filtering can require nontrivial modifications, since the Fourier transform, which is the tool that converts the time-series data from the temporal domain to the frequency domain, is not defined on the space of graphs. Nevertheless, Fourier transform also can correspond to the eigen-decomposition of the Laplacian operator that consists of the second-order derivatives. The Laplacian operator, which originally characterizes the heat diffusion (or how quickly the energy changes), can be well-defined on graphs. As a consequence, the Fourier transform through the lens of Laplacian operator can be equivalently defined. Since the eigen-decomposition can also be referred to as the spectral decomposition, carrying out the filtering on the "frequency" space obtained though the spectral decomposition is known as the spectral filtering.

As another example, the technical field based on using graph Fourier transform and spectral filtering can include an understanding of how to implement spectral filtering technology.

For example, introducing the concepts to describe a graph can be expressed as follows:

Specifically, let A be the adjacency matrix for the graph $\mathcal{G} = (v, \varepsilon, \mathcal{W})$, where $v$ is the set for nodes, $\varepsilon$ is the set for edges and $\mathcal{W}$ is the set for edge weights. Then $A_{i,j} = \mathcal{W}(\varepsilon_{i,j})$ that reflects the weight (connectivity) between node i and j. We use D to denote the diagonal degree matrix such that $D_{i,i}$ is the sum of weights $\Sigma_j A_{i,j}$ for node i. The function N(i) gives the set of neighbor nodes of i.

On the real line, the Laplace operator is the second derivative:

$$\Delta f = \lim_{\delta \to 0} \frac{f(x+\delta) - 2f(x) + f(x-\delta)}{\delta^2}.$$

For functions f defined on the nodes of the graph, the discretized version for the above definition is used, which simply reduces to the difference of f(i) and f evaluated at all the neighbors of node i:

$$\Delta f(i) = \sum_{j \in N(i)} f(i) - f(j)$$

Hence, applying the Laplacian operator to function $f$ is equivalent to multiplying $[f(1), \ldots, f(|v|)]$ by the matrix: L=D−A. Sometimes, the normalized version of the Laplacian matrix also is used:

$$\tilde{L} = D^{-1/2} L D^{-1/2}.$$

As mentioned in the previous section, the Fourier transform of a function $f$ is the expansion of $f$ in terms of the eigenfunctions of the Laplace operator. Recall that the Laplacian matrix admits the following decomposition:

$\tilde{L} = U \Lambda U^T$, $U = [U_1, \ldots, U_{|v|}]$ forms a set of orthogonal basis, and $\Lambda = \text{diag}(\lambda_1, \ldots, \lambda_{|v|})$ consists of the eigenvalues (referred to as the spectrum of the graph).

Hence, the graph Fourier transform for function $f$, which maps a node to some output space, is the expansion of $f$ in terms the eigenfunctions of the Laplacian matrix:

$$\hat{f}(\lambda_k) = \sum_{i=1}^{|v|} f(i) U_k[i] = \langle \vec{f}, U_k \rangle,$$

where $\hat{f} = [f(1), \ldots f(|v|)]$. Using the shorthand, we have: $\vec{\hat{f}} = U^T \vec{f}$.

Similarly, the inverse Fourier transform, which maps $\vec{\hat{f}}$ back to the original $\vec{f}$, is given by: $\vec{f} = U \vec{\hat{f}}$.

Hence, the graph convolution of $f$ under g, which can be referred to as applying operations defined by g on the spectrum of the graph (think of it as the collection of frequencies in time series), can be formulated as:

$$g \star f(i) = \sum_{k=1}^{|v|} \hat{g}(\lambda_k) \cdot \hat{f}(\lambda_k) U_k[i].$$

When selecting g to serve as a filtering, e.g. preserve and remove certain elements in the spectrum of $[\lambda_1, \ldots, \lambda_{|v|}]$, its Fourier transform $\hat{g}$ can be directly parameterize such that:

$$g_\theta \star f(i) = \sum_{k=1}^{|v|} \hat{g}_\theta(\lambda_k) \cdot \hat{f}(\lambda_k) U_k[i].$$

For example, just as in the time-series analysis to remove high frequency components (e.g. frequency larger than θ), $\hat{g}_\theta(\lambda)$ an be set to $\hat{g}_\theta(\lambda)=1[\lambda<\theta]\lambda$, where 1 [•] is the indicator function.

In other words, if X is the node feature matrix (which equals to having $f$ as the feature map: $f(i)=X_i$, then the spectral filtering of X under the filter $g_\theta$ is expressed by:

$$g_\theta \star X = U \text{ diag}(\hat{g}_\theta(\lambda_1), \ldots, \hat{g}_\theta(\lambda_{|v|}))U^T X.$$

The shorthand $G_\theta(\Lambda)$ can be used to denote $\text{diag}(\hat{g}_\theta(\lambda_1), \ldots, \hat{g}_\theta(\lambda_{|v|}))$ such that $g_\theta \star X = U G_\theta(\Lambda) U^T X$.

Using graph convolutional network as spectral filtering can obtain a good filter $G_\theta$ in an data-adaptive fashion.

Instead of designing a filter $G_\theta$ in advance, learn a good $G_\theta$ for a specific task after the data is observed. Without any model assumption, $G_\theta$ can take any format, which can makes it difficult to tell how to parameterize it. On the other hand, $G_\theta$ can be expanded to a series to linear functions using the Chebyshev polynomial:

$$G_\theta(\Lambda) = \sum_{k=0}^{\infty} \theta_k T_k(\Lambda)$$

where $\{T_k\}$ is the expansion polynomial series, where $T_0(\Lambda)=I$ and $T_1(\Lambda)=\Lambda$.

Later, a specific type of parameterization can be used by truncating the above Chebyshev series at k=1 with $\theta_0=2\theta$, $\theta_1=-\theta$, $\theta_k=0$ for k>1, so the spectral filtering under this specific $G_\theta$ becomes:

$$g_\theta \star X = \theta(I+\tilde{L})X.$$

This is referred to as a single graph convolution layer. By stacking multiple graph convolution layers, and by using activation functions among each layer, the graph convolutional network can be constructed as:

$$\ldots \sigma(\theta_2(I+\tilde{L})\sigma(\theta_1(I+\tilde{L})X) \ldots,$$

where $\theta_i$ is the unknown weight matrix for each layer.

Further, as an example, instead of studying graph convolution network as a machine learning model, as it is shown in the existing literature, its capability can be further explored as a spectral filtering mechanism to use the useful signal in the graph to enhance the quality of node features X.

Specifically, all the activation functions can be removed among the layers, so the graph convolution network becomes:

$$\sigma((I+\tilde{L})^k X \theta_1 \ldots \theta_k),$$

where k is the number of layers. Let $\theta_0=\theta_1 \ldots \theta_k$ represent the parameterization of the above model, so it becomes:

$$\sigma((I+\tilde{L})^k X \theta_0)$$

Compared with the original goal of spectral filtering, as described using the format of (as shown above):

$$g_\theta \star X = U \text{ diag}(\hat{g}_\theta(\lambda_i), \ldots, \hat{g}_\theta(\lambda_{|v|}))U^T X,$$

$(I+\tilde{L})^k X\theta_0$ can play a the role in filtering. By simple algebra, expressed as:

$$(I+\tilde{L})^k X\theta_0 = U\theta_0 \text{ diag}((2-\lambda_1)^k, \ldots, (2-\lambda_{|v|})^k)U^T X,$$

where $(I+\tilde{L})^k X\theta_0$, can filter the spectrum using the filter function $\theta_0(2-\lambda)^k$.

Note that $2 \geq \lambda_1, \ldots, \lambda_{|v|} \geq 1$ based on working with the normalized Laplacian matrix. As a consequence, the components that correspond to a large λ can be shrunken more heavily by an increased k, because $2-\lambda \leq 1$, and the components that correspond a small can be more preserved. Hence, $(I+\tilde{L})^k X\theta_0$ can include playing the role of a "low-pass filter", which corresponds to letting pass the low-frequency signals in time-series analysis.

In the above derivations, $\theta_0$ can refer to a single parameter that plays the role of scaling. Multiple scaling factors can be employed. The components can be linearly combined with a different spectrum, by making $\theta_0$ into a parameter matrix Θ. A final formulation for the low-pass spectral filtering can be given by:

$$X(\Theta) = \sigma((I+\tilde{L})^k X \Theta),$$

where X(Θ) can be the matrix of node features after the spectral filtering, with better signals that the original node features X.

In various examples, recommendations for similar items can include generating an item-to-item graph $\mathcal{G}$, which represents item-pair similarities. In some embodiments, item-to-item graphs can be constructed from historical user interaction data. In several embodiments, spectral filtering can be conducted on the item features X with a goal to find an optimal Θ.

In some embodiments, a set of (item1, item2, label) data can represent whether the two items are similar. The construction of $\mathcal{G}$, T and the labels are provided above regarding the item relational graph and data 507 (FIG. 5). In various embodiments, $X(\Theta)_i$ can be the filtered feature vector for item i, and $\langle X(\Theta)_i, X(\Theta)_j \rangle$ can be used to denote the similarity score $s_{ij}$ between these two items, such that the higher the score, the more likely that the label is positive (e.g., items are similar). In some embodiments, the expression $y_{i,j}$ can be used to denote a label for item pair (i,j), that can be used find Θ that minimizes a total risk, mathematically expressed as:

$$\sum_{i,j \in D} \ell(y_{i,j}, \langle X(\Theta)_i, X(\Theta)_j \rangle),$$

where l(•,•) can be a loss function, such as the binary cross-entropy loss. In several embodiments, a stochastic gradient descent can be used to find the optimal Θ.

Returning to FIG. 4, in some embodiments, block 440 can include receiving an item relational graph of the one or more item relational graphs comprising two or more nodes connected by one or more edge weights. In several embodiments, the one or more edge weights can represent one or more degrees of item-pair similarity.

Figure 6:
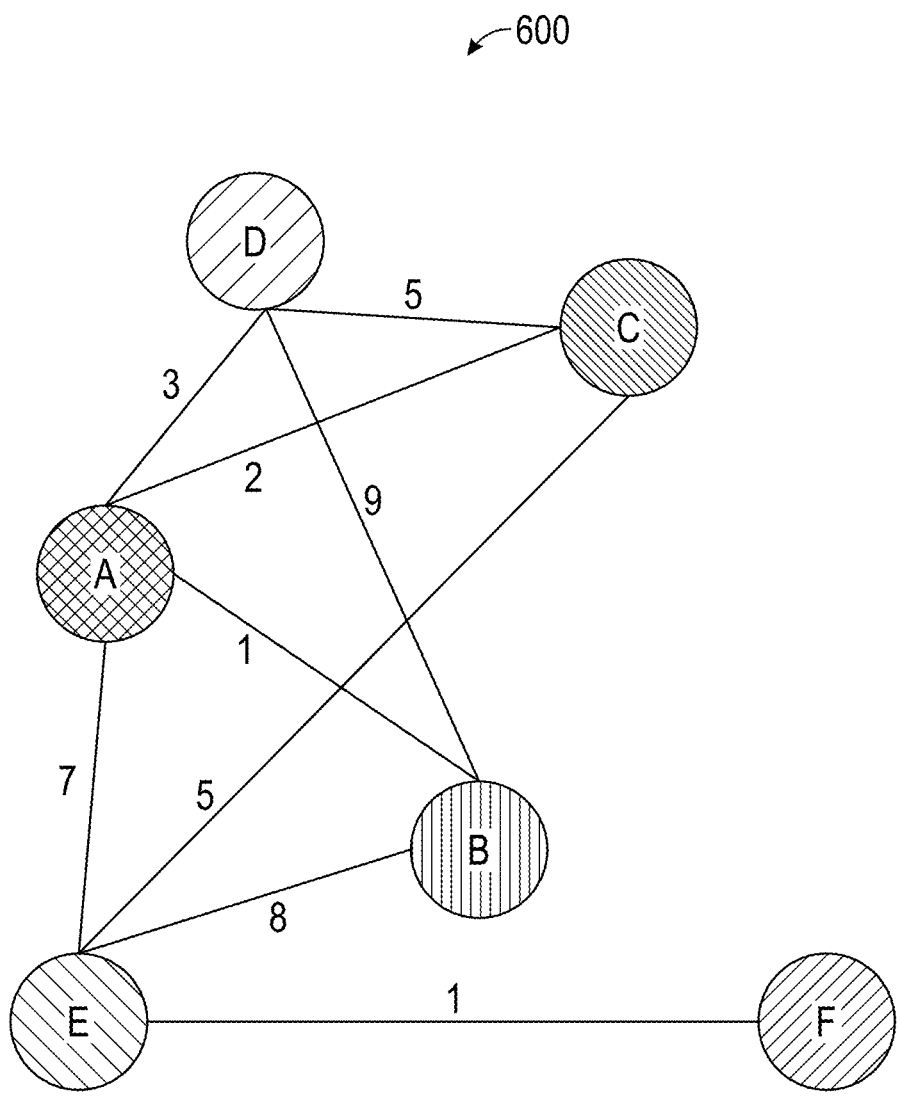
FIG. 6 illustrates an exemplary graph according to an embodiment.

Jumping ahead in the drawings, FIG. 6 can include an exemplary graph 600, according to an embodiment. Graph 600 can be constructed from historical user (e.g., customer) action and/or behavior, such as accepting (e.g., ordering) via a webpage (i) an item recommended as a similar item of interest to a user and/or (ii) a substitute item recommended to replace an unavailable item. Graph 600 can include nodes (nodes A, B, C, D, E, F each representing an item) connected to edge weights on a graph, such edge weights can be illustrated by a distance (e.g, the counts between nodes) between each node from among two connected nodes (e.g., item pairs). In many embodiments, a formula for a relative gain as edge weights can take into account both a low rejection rate as well as a high (raw) number of accepted orders, expressed as a relative gain formula:

$$R(i,j) = \text{accept count}(i,j)/\text{rejection rate}(i,j,)$$

Where R refers to a relative gain, i refers to an item, j refers to another item and i,j, refer to an item pair. In several embodiments, a rejection rate can include a number of times an item can be recommended over a period of time. In a number of embodiments, a higher relative gain for an item pair using the relative gain formula can be understood as when an item pair has a higher number of acceptances and/or a lower rejection rate (i.e., an increased level of relative gain showing the item pair is more similar than other item pairs).

As an example to illustrate an advantage of a low rejection rate to calculate a relative gain output for an item pair. For three item pairs, such as (item A, item B), (item A, item C) and (item A, item D), item B can be offered 100 times as a recommendation for item A, where users accepted item B as the recommendation 50 times out of 100 times that item B was offered. Additionally, item C can be offered 50 times as a recommendation for item A where users accepted item C 40 times out of 50 times that item C was offered. Next, item D can be offered 100 times as a recommendation for item A where users accepted item D 75 times out of 100 times that item D was offered. Therefore, as part of this example, relative gain can be represented by item pairs (e.g., item A, item B) with a higher similarity to each other due to a higher acceptance rate over a high number of orders. Specifically, with reference to FIG. 6, item pair (item A, item B) has a lower acceptance rate than item pairs (item A, item C) and (item A, item D), and item pair (item A, item C) has a lower acceptance rate than item pair (item A, item D). As also shown in FIG. 6, item pairs (item B, item D), (item B, item E), and (item A, item E) have the three highest acceptance rates, respectively, of all of the item pairs shown in the figure.

As another example, relative gain can be expressed as per the relative gain formula, for (item A, item B)=a total number of accepted orders/rejection rate=50/0.5=100. Additionally, as mathematically expressed (item A, item C)=40/0.2=200, and (item A, item D)=75/0.25=300.

Turning back to FIG. 4, in a number of embodiments, method 400 can include a block 445 of removing noise from the one or more frequency signals. In some embodiments, block 445 can be part of block 440.

In several embodiments, method 400 can include a block 450 of constructing, using a machine learning model, one or more item pair label classifications for one or more item pairs of the one or more items. In some embodiments, the machine learning model is a feed-forward neural network.

In various embodiments, block 450 can include training a data set based on input comprising historical item data over a period of time by encoding, using contextual feature encoding, the one or items. In some embodiments, contextual feature encoding can be performed for each product in a product catalog, such as itemA->enc (A).

In many embodiments, contextual feature encoding can include using Poincare encoding. In various embodiments, Poincare encoding can be performed on a product hierarchy.

In several embodiments, training the data set also can include measuring a similarity, using a Jaccard similarity coefficient, of respective titles for each item within the one or more item pairs. For example, measuring the similarity of each respective title for "Haggen-daz vanilla ice cream" and "Dairy Queen vanilla & strawberry ice cream" can be performed as follows:

Let senA, senB (sentence A, sentence B) refer to the description sentence for itemA and itemB. Where Jaccard (senA, senB)=#intersection(senA, senB)/#union(senA, senB), where the output can illustrate a gauge of similarity between the titles of each item in each item pair.

In various embodiments, training the data set can additionally include constructing a positive label or a negative label used for the machine learning classification task. In many embodiments, constructing a positive label sampling (e.g., item pair can be more similar) for an item pair can include inputs including a high contextual feature encoding similarity (e.g., inner product<enc(A), enc(B)>) as shown in an item relational graph for the item pair, a high relative gain on an item relational graph for items recommended and accepted, a high relative gain on an item relational graph for items recommended and accepted as substitutes, and/or a high Jaccard similarity score. In some embodiments, a positive label can be for item pairs similar to an anchor item from less than 20th percentile. In several embodiments, a hard negative label sampling can be from sample item pairs from greater than $20^{th}$ percentile of the output of the positive label metrics. Similarly, in some embodiments, a simple negative label sampling can be from sample item pairs from the also greater than the 20th percentile for all the above metrics.

In some embodiments, method 400 also can include a block 455 of generating a respective similarity score for each of the one or more item pairs. In several embodiments, generating the respective similarity score can include outputting a probability that a recommendation or a substitute based on an item pair of the one or more item pairs will be selected by the users.

In various embodiments, method 400 further can include a block 460 of outputting a top k results for the one or more item pairs ranked by the respective similarity scores.

In many embodiments, method 400 also can include a block 465 of re-ranking, using a re-ranking algorithm, the top k results of the one or more item pairs based on a user preference for display on a user interface of an electronic device of a user. In some embodiments, an algorithm for re-ranking similar items can include a training data set. In various embodiments, block 465 can be performed as shows in Algorithm 1:

---

Algorithm 1 Re-ranking Algorithm for OG-Similar Items: Training

IINPUT: A given set of n Customer, Anchor, Recommendation
triplets : T : {C, A, R} and a label set L {$l_1$, $l_2$, ... $l_n$} based
on CTR, The set of product types P {$P_1$, $P_2$, ... $P_m$}
OUTPUT: Weights for each feature of each product type
1:    procedure TRAINING(T, F)
2:        Initialize W{$W_1$ : {Φ} ... $W_m$ : {Φ}}
3:        for p ∈ P do
4:        Get $T_p$, $L_p$, the set of triplets and labels from T, L
such that for each $c_p$, $a_p$, $r_p$ ∈ $T_p$, $L_p$, ProductType($a_p$) = p
5:        Use the trainset $T_p$, $L_p$ to train model with weights $W_p$ :
$w_{1p}$.$w_{2p}$, .. $w_{kp}$ of the logistic regression model
6:        Add $W_p$ to W
7:        end for
8:    end procedure

---

In several embodiments, block 465 also can be performed as shown in Algorithm 2:

---

Algorithm 2 Re-ranking Algorithm for OG Similar Items: Inferencing

INPUT: Serving Layer context: customer c, Anchor item a and
Recommendations R : $r_1$, $r_2$ ... $r_n$, Trained product type weights W :
$W_1$, $W_2$, ... $W_p$, The Customer Understanding affinity vectors CU :
{$c_1$ : a, $c_2$ : b, ... $c_n$ : d}
OUTPUT: Re-Ranked List of items R* :
1:    procedure RERANK (c, a, R, W) Initialize R* ← {Φ}
2:        for r ∈ R do -continued Algorithm 2 Re-ranking Algorithm for OG Similar Items: Inferencing 3:       Get $W_p$ : $w_{1p}, w_{2p}, .. w_{kp}$ : The weights of product type p such that ProductType(a) = p
4:       Look up the Customer Affinity vectors of c based on the attributes of r from CCI
5:       Construct feature vector x as a .combination of the model score of r and the affinity vector
6:       Do $W_p.x$ to get the new score y* ar for r
7:       Add y* ar to R*
8:       end for
9:       Sort R* based on, non, increasing: values of y* ar
10:      end procedure In several embodiments, using the re-ranking algorithm can include receiving affinity preferences for the user based on one or more features of an anchor item of the one or more item pairs in the top k results, as ranked.

In some embodiments, using the re-ranking algorithm also can include constructing a respective affinity vector for each of the affinity preferences of the anchor item.

In many embodiments, using the re-ranking algorithm further can include scoring each item pair of the one or more item pairs, as ranked, based on the respective affinity vector of the anchor item.

In various embodiments, re-ranking the top k results can include re-ranking a subset of the top k results based on an affinity score for the user. In some embodiments, the user preference comprises the affinity score for the user.

Figure 7:
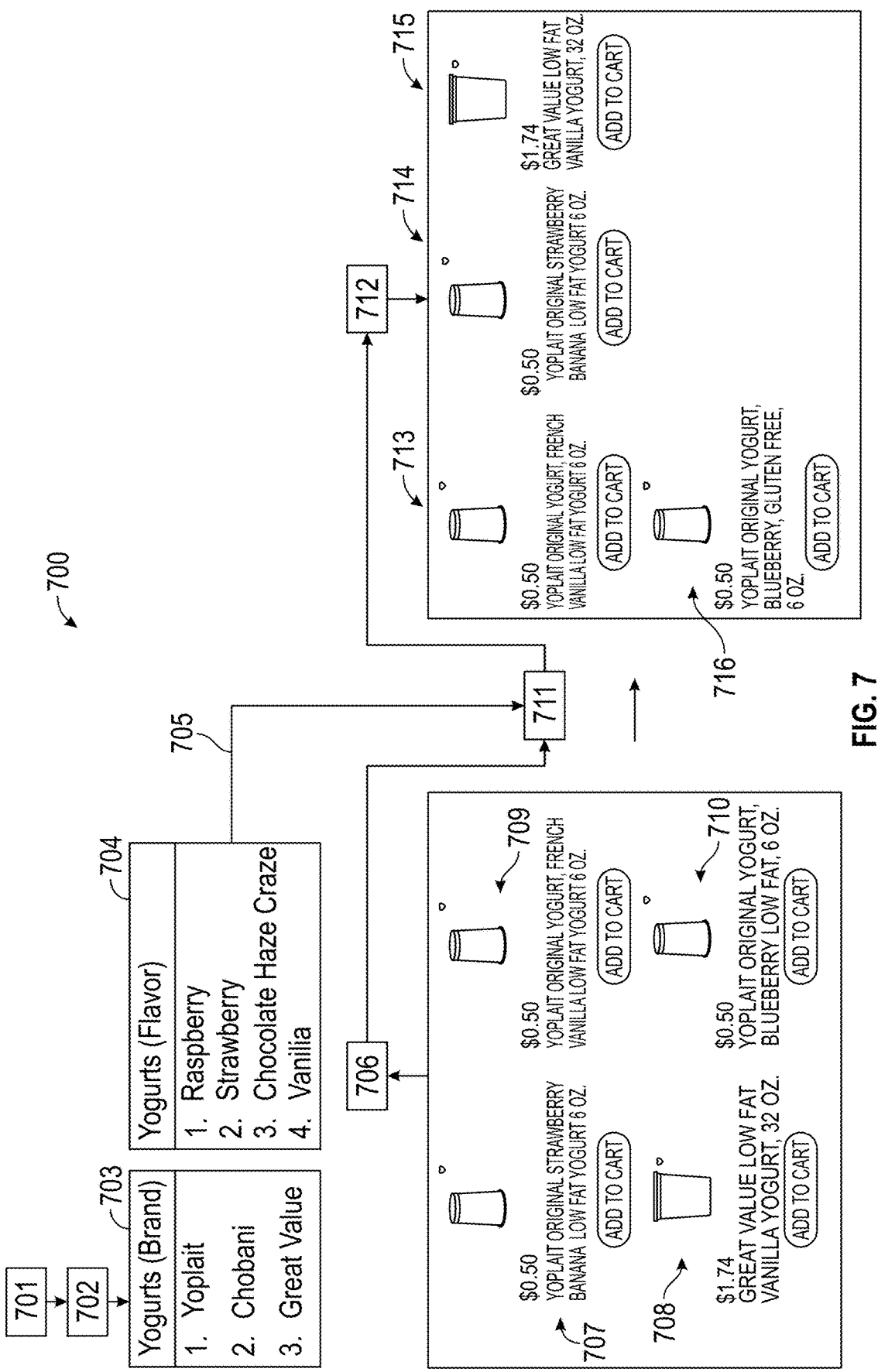
FIG. 7 illustrates a flow diagram of a re-ranker algorithm, according to an embodiment.

Jumping ahead to the drawings, FIG. 7 illustrates a flow diagram of a re-ranker algorithm for a method 700, a according to an embodiment. Method 700 is merely exemplary and embodiments of the acts, modules, and outputs are not limited to the embodiments presented herein. The acts, modules, and outputs can be employed in many different embodiments or examples not specifically depicted or described herein. In some embodiments, certain elements of method 700 can perform, involve, and/or be generated by involve various procedures, processes, and/or activities. In other embodiments, the procedures, processes, and/or activities can be performed by, and the outputs can be generated by, other suitable elements of method 700. In many embodiments, method 700 can be implemented by system 300 (FIG. 3) and/or block diagram 500 (FIG. 5).

In several embodiments, method 700 illustrates a data pipeline showing how a personalization layer added to an output of a top k results in a set of re-ranked top k results. In several embodiments, method 700 can a user 701, a cart 702, and data collected based on user actions for brand 703 (e.g., yogurt (brand)) and flavor 704 (e.g., yogurt (flavor). In some embodiments, preference 705 can represent a user preference from historical transactions for an item (e.g., yogurt).

In some embodiments, list 706 can include a non-personalized list of recommended items associated with an anchor item of the items using the respective ordered list of flavors for the user. In some embodiments, ranking similar items non-personalized can be expressed:

$y = f(\text{relevance score})$

For example, if a user selects an anchor item of Yoplait strawberry yogurt, a non-personalized list of recommended items can include 4 yogurt brands and flavors in an order: Yoplait strawberry banana 707, Yoplait French vanilla 709, Great Value low-fat vanilla 708, and Yoplait blueberry 710. In various embodiments, algorithm 711 (e.g., a re-ranking algorithm) can personalize the existing ranking of similar items in the non-personalized list by including a preference layer of preference 705. In several embodiments, ranking similar items personalized to a user can be expressed as:

$y = f(\text{relevance score}, \text{flavor score})$ $y = w_1 \times \text{relevance score} + w_2 \times \text{flavor score}$ In many embodiments, applying a personalization layer of preference 705 to the non-personalized list of recommended items can use the same list of items recommended and changes the order based on the flavor preference of the user. For example, a list 712 (e.g., a personalized list) of recommended items can re-rank the brand and flavor preference of the user to the following re-ranked order: Yoplait French vanilla 709, Yoplait strawberry banana 713, Great Value low-fat vanilla 715, and Yoplait blueberry 716.

Returning to the drawings, FIG. 3 illustrates a block diagram of spectral filtering system 310. Spectral filtering system 310 is merely exemplary and is not limited to the embodiments presented herein. Spectral filtering system 310 can be employed in many different embodiments or examples not specifically depicted or described herein. In some embodiments, certain elements or systems of spectral filtering system 310 can perform various procedures, processes, and/or acts. In other embodiments, the procedures, processes, and/or acts can be performed by other suitable elements or systems. In many embodiments, the systems of spectral filtering system 310 can be modules of computing instructions (e.g., software modules) stored at non-transitory computer readable media. In other embodiments, the systems of spectral filtering system 310 can be implemented in hardware.

In many embodiments, spectral filtering system 310 can include a communication system 311. In a number of embodiments, communication system 311 can at least partially perform block 405 (FIG. 4) of receiving, from users, a selection of a first item, wherein the first item is a recommended item, and/or block 420 (FIG. 4) of receiving, from users, a selection of a third item of the one or more items, wherein the third item is substituted for a second item of the one or more items.

In several embodiments, spectral filtering system 310 also can include a scoring system 312. In various embodiments, scoring system 312 can at least partially perform block 455 (FIG. 4) of generating a respective similarity score for each of the one or more item pairs, and/or block 460 of outputting a top k results for the one or more item pairs ranked by the respective similarity scores.

In many embodiments, spectral filtering system 310 further can include a graph system 313. In several embodiments, graph system 313 can at least partially perform block 435 (FIG. 4) of generating one or more item relational graphs for one or more items based on historical user purchases, block 440 (FIG. 4) of transforming, using spectral filtering, the one or more item relational graphs into one or more frequency signals to remove noise from the one or more frequency signals, and/or block 445 (FIG. 4) of removing noise from the one or more frequency signals.

In some embodiments, spectral filtering system 310 additionally can include a generating system 314. In many embodiments, generating system 314 can at least partially perform block 410 (FIG. 4) of generating a first node for the first item on an item relational graph of the one or more item relational graphs, block 415 (FIG. 4) of generating a second node for a recommendation for the first item, wherein the first node is connected to the first node on the item relational graph of the one or more item relational graphs, block 425

(FIG. 4) of generating a third node for the third item on an item relational graph of the one or more item relational graphs, and/or block 430 (FIG. 4) of generating a fourth node for a substitution of the third item for the second item, wherein the fourth node is connected to the third node on the item relational graph of the one or more item relational graphs.

In various embodiments, spectral filtering system 310 also can include a machine learning system 315. In some embodiments, machine learning system 315 can at least partially perform block 450 (FIG. 4) of constructing, using a machine learning model, one or more item pair label classifications for one or more item pairs of the one or more items.

In several embodiments, spectral filtering system 310, additionally can include a ranking system 316. In various embodiments, ranking system 316 can at least partially perform block 460 (FIG. 4) of outputting a top k results for the one or more item pairs ranked by the respective similarity scores and/or block 465 (FIG. 4) of re-ranking, using a re-ranking algorithm, the top k results of the one or more item pairs based on a user preference for display on a user interface of an electronic device of a user.

In several embodiments, web server 320 can at least partially perform sending instructions to user computers (e.g., 350-351 (FIG. 3)) based on information received from communication system 311.

In a number of embodiments, the techniques described herein can advantageously provide a consistent user experience by dynamically and automatically generating similar items using spectral filtering, such as spectral filtering system 310 (FIG. 3), across different applications that query this information, such as product information, existing rules, etc. For example, over two million product updates can be received from third-party vendors in one day. In some embodiments, the techniques provided herein can beneficially reduce computing resources and costs while continuing to offer real time updates based on rule change events for the products received each second, minute, and/or other suitable period of time in at least a day, a week, and/or other suitable periods of time. For example, a catalog can include approximately one hundred million items and/or products at any given period of time.

In many embodiments, the techniques described herein can be used continuously at a scale that cannot be handled using manual techniques. For example, the number of daily and/or monthly visits to the webpage can exceed approximately ten million and/or other suitable numbers, the number of registered users to the content source can exceed approximately one million and/or other suitable numbers, and/or the number of products and/or items sold on the website can exceed approximately ten million (10,000,000) approximately each day.

In a number of embodiments, the techniques described herein can solve a technical problem that arises only within the realm of computer networks, as automatically generating similar items using spectral filtering does not exist outside the realm of computer networks. Moreover, the techniques described herein can solve a technical problem that cannot be solved outside the context of computer networks. Specifically, the techniques described herein cannot be used outside the context of computer networks, in view of a lack of data, and because a content catalog, such as an online catalog, that can power and/or feed an online website that is part of the techniques described herein would not exist.

In several embodiments, an advantage of using a scalable graph convolutional network as an end-to-end production system can include a system that can be scalable yet interpretable and controllable with the internal multiple-recall sets and ranking algorithms. In some embodiments, the system can accept all data for item attributes by embedding oriented design that combines the item attributes with user (e.g., customer) signal with little feature engineering efforts. In various embodiments, the ability to digest multiple input signals (graphs) can reduce bias and increase precision as all signals can be used from historical viewing (browsing) records and search records. In some embodiments, the ability to digest multiple input signals (graphs) also can include time sensitive and season sensitive user signals from different time periods that can provide useful information. In many embodiments, using a scalable design that can accelerate training by using parallel computing can be advantageous by providing enhanced coverage and precision.

Various embodiments can include a system including one or more processors and one or more non-transitory computer-readable media storing computing instructions configured to run on the one or more processors and perform certain acts. The acts can include generating one or more item relational graphs for one or more items based on historical user purchases. The acts also can include transforming, using spectral filtering, the one or more item relational graphs into one or more frequency signals to remove noise from the one or more frequency signals. The acts further can include constructing, using a machine learning model, one or more item pair label classifications for one or more item pairs of the one or more items. The acts additionally can include generating a respective similarity score for each of the one or more item pairs. The acts also can include outputting a top k results for the one or more item pairs ranked by the respective similarity scores. The acts further can include re-ranking, using a re-ranking algorithm, the top k results of the one or more item pairs based on a user preference for display on a user interface of an electronic device of a user.

A number of embodiments can include a method being implemented via execution of computing instructions configured to run at one or more processors and stored at one or more non-transitory computer-readable media. The method can include generating one or more item relational graphs for one or more items based on historical user purchases. The method also can include transforming, using spectral filtering, the one or more item relational graphs into one or more frequency signals to remove noise from the one or more frequency signals. The method further can include constructing, using a machine learning model, one or more item pair label classifications for one or more item pairs of the one or more items. The method additionally can include generating a respective similarity score for each of the one or more item pairs. The method also can include outputting a top k results for the one or more item pairs ranked by the respective similarity scores. The method further can include re-ranking, using a re-ranking algorithm, the top k results of the one or more item pairs based on a user preference for display on a user interface of an electronic device of a user.

Although automatically determining a rule change event that can affect certain attributes of a product for display as expressed in a content catalog using a reactive attribute management platform has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-7 may be modified, and that the foregoing discussion of certain of these embodiments does not necessarily represent a complete description of all possible embodiments. For example, one or more of the procedures, processes, or activities of FIGS. 3-7 may include different procedures, processes, and/or activities and be performed by many different modules, in many different orders, and/or one or more of the procedures, processes, or activities of FIGS. 3-7 may include one or more of the procedures, processes, or activities of another different one of FIGS. 3-7. As another example, the systems within spectral filtering system 310, and/or, webserver 320. Additional details regarding spectral filtering system 310 and/or web server 320, (see FIG. 3) can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents

What is claimed is:

1. A system comprising:
    one or more processors; and
    one or more non-transitory computer-readable media storing computing instructions that, when executed on the one or more processors, cause the one or more processors to perform operations comprising:
        training a re-ranking algorithm by utilizing a training data set comprising a set of recommendation triplets, a label set, and a set of product types as inputs and weights assigned to each product feature of each product type as outputs;
        generating one or more item relational graphs for one or more items based on historical user purchases;
        transforming, using spectral filtering, the one or more item relational graphs into one or more frequency signals to remove noise from the one or more frequency signals;
        training a feed-forward neural network machine learning model using a data set based on input for the data set comprising historical item data over a first period of time by:
            encoding, using contextual feature encoding, the one or more items, wherein a respective encoding for each of the one or more items encoded comprises a respective vector;
            constructing, using the feed-forward neural network machine learning model, one or more item pair label classifications for one or more item pairs of the one or more items as output of the feed-forward neural network machine learning model, wherein input of the feed-forward neural network machine learning model comprises the one or more frequency signals, wherein the feed-forward neural network machine learning model labels the one or more item pairs based on levels of similarity between items of the one or more item pairs, and wherein each item of the one or more items is associated with a respective vector code;
        generating a respective similarity score for each of the one or more item pairs;
        outputting a top k results for the one or more item pairs ranked by the respective similarity scores for the one or more item pairs, wherein the top k results are configured to be displayed in an order on a user interface of an electronic device of a user as a first display;
        combining data from a personalization layer with the top k results to output a personalized ordered list of items associated with an item of the one or more items;
        re-ranking, using the re-ranking algorithm, as trained, the top k results of the one or more item pairs based on the personalized ordered list of items, wherein the re-ranking algorithm further re-ranks the order of the top k results of the first display based on the personalization layer; and
        displaying a second display presenting the personalized ordered list of items on the user interface of the electronic device of the user based on an output of the re-ranking algorithm.

2. The system of claim 1, wherein the computing instructions, when executed on the one or more processors, further cause the one or more processors to perform operations comprising:
    receiving, from users, a selection of a first item of the one or more items, wherein the first item is recommended to the users;
    generating a first node for the first item on an item relational graph of the one or more item relational graphs; and
    generating a second node for a recommendation for the first item, wherein the second node is connected to the first node on the item relational graph of the one or more item relational graphs, wherein an edge connecting the first node and the second node comprises a recommendation edge weight based on a number of times the recommendation for the first item is selected by the users over a second period of time.

3. The system of claim 1, wherein the computing instructions, when executed on the one or more processors, further cause the one or more processors to perform operations comprising:
    receiving, from users, a selection of a third item of the one or more items, wherein the third item is substituted for a second item of the one or more items;
    generating a third node for the third item on an item relational graph of the one or more item relational graphs; and
    generating a fourth node for a substitution of the third item for the second item, wherein the fourth node is connected to the third node on the item relational graph of the one or more item relational graphs, wherein an edge connecting the third node and the fourth node comprises a substitution edge weight based on a number of times the substitution of the third item for the second item is selected by the users over a third period of time.

4. The system of claim 1, wherein:
using the spectral filtering further comprises:
receiving an item relational graph of the one or more item relational graphs comprising two or more nodes connected by one or more edge weights, wherein the one or more edge weights represent one or more degrees of item-pair similarity.

5. The system of claim 1, wherein transforming, using the spectral filtering, the one or more item relational graphs further comprises using a time-frequency domain.

6. The system of claim 5, wherein using the contextual feature encoding further comprises:
using Poincare encoding.

7. The system of claim 5, wherein training the feed-forward neural network machine learning model further comprises:
measuring a similarity, using a Jaccard similarity coefficient, of respective titles for each item within the one or more item pairs.

8. The system of claim 1, wherein:
a label of the labels comprises a positive label or a positive sample.

9. The system of claim 1, wherein generating the respective similarity score further comprises:
outputting a probability that a recommendation or a substitute based on an item pair of the one or more item pairs will be selected by users.

10. The system of claim 1, wherein:
using the re-ranking algorithm further comprises:
receiving affinity preferences for the user based on one or more features of an anchor item of the one or more item pairs in the top k results, as ranked;
constructing a respective affinity vector for each of the affinity preferences of the anchor item; and
scoring each item pair of the one or more item pairs, as ranked, based on the respective affinity vector of the anchor item; and
re-ranking the top k results further comprises:
re-ranking a subset of the top k results based on an affinity score for the user.

11. A method being implemented via execution of computing instructions configured to run on one or more processors and stored at one or more non-transitory computer-readable media, the method comprising:
training a re-ranking algorithm by utilizing a training data set comprising a set of recommendation triplets, a label set, and a set of product types as inputs and weights assigned to each product feature of each product type as outputs;
generating one or more item relational graphs for one or more items based on historical user purchases;
transforming, using spectral filtering, the one or more item relational graphs into one or more frequency signals to remove noise from the one or more frequency signals;
training a feed-forward neural network machine learning model using a data set based on input for the data set comprising historical item data over a first period of time by:
encoding, using contextual feature encoding, the one or more items, wherein a respective encoding for each of the one or more items encoded comprises a respective vector;
constructing, using the feed-forward neural network machine learning model, one or more item pair label classifications for one or more item pairs of the one or more items as output of the feed-forward neural network machine learning model, wherein input of the feed-forward neural network machine learning model comprises the one or more frequency signals, wherein the feed-forward neural network machine learning model labels the one or more item pairs based on levels of similarity between items of the one or more item pairs, and wherein each item of the one or more items is associated with a respective vector code;
generating a respective similarity score for each of the one or more item pairs;
outputting a top k results for the one or more item pairs ranked by the respective similarity scores for the one or more item pairs, wherein the top k results are configured to be displayed in an order on a user interface of an electronic device of a user as a first display;
combining data from a personalization layer with the top k results to output a personalized ordered list of items associated with an item of the one or more items;
re-ranking, using the re-ranking algorithm, as trained, the top k results of the one or more item pairs based on the personalized ordered list of items, wherein the re-ranking algorithm further re-ranks the order of the top k results of the first display based on the personalization layer; and
displaying a second display presenting the personalized ordered list of items on the user interface of the electronic device of the user based on an output of the re-ranking algorithm.

12. The method of claim 11, further comprising:
receiving, from users, a selection of a first item of the one or more items, wherein the first item is recommended to the users;
generating a first node for the first item on an item relational graph of the one or more item relational graphs; and
generating a second node for a recommendation for the first item, wherein the second node is connected to the first node on the item relational graph of the one or more item relational graphs, wherein an edge connecting the first node and the second node comprises a recommendation edge weight based on a number of times the recommendation for the first item is selected by the users over a second period of time.

13. The method of claim 11, further comprising:
receiving, from users, a selection of a third item of the one or more items, wherein the third item is substituted for a second item of the one or more items;
generating a third node for the third item on an item relational graph of the one or more item relational graphs; and
generating a fourth node for a substitution of the third item for the second item, wherein the fourth node is connected to the third node on the item relational graph of the one or more item relational graphs, wherein an edge connecting the third node and the fourth node comprises a substitution edge weight based on a number of times the substitution of the third item for the second item is selected by the users over a third period of time.

14. The method of claim 11, wherein:
using the spectral filtering further comprises:
receiving an item relational graph of the one or more item relational graphs comprising two or more nodes connected by one or more edge weights, wherein the one or more edge weights represent one or more degrees of item-pair similarity.

15. The method of claim 11, wherein using the spectral filtering further comprises:
   transforming, using the spectral filtering, the one or more item relational graphs further comprises using a time-frequency domain.

16. The method of claim 15, wherein using the contextual feature encoding further comprises:
   using Poincare encoding.

17. The method of claim 15, wherein training the feed-forward neural network machine learning model further comprises:
   measuring a similarity, using a Jaccard similarity coefficient, of respective titles for each item within the one or more item pairs.

18. The method of claim 11, wherein:
   a label of the labels comprises a positive label or a positive sample.

19. The method of claim 11, wherein generating the respective similarity score further comprises:
   outputting a probability that a recommendation or a substitute based on an item pair of the one or more item pairs will be selected by users.

20. The method of claim 11, wherein:
   using the re-ranking algorithm, further comprises:
      receiving affinity preferences for the user based on one or more features of an anchor item of the one or more item pairs in the top k results, as ranked;
      constructing a respective affinity vector for each of the affinity preferences of the anchor item; and
      scoring each item pair of the one or more item pairs, as ranked, based on the respective affinity vector of the anchor item; and
   re-ranking the top k results further comprises:
      re-ranking a subset of the top k results based on an affinity score for the user.

* * * * *